March 21, 1933.  B. C. GOSS  1,901,960
INSECTICIDAL SOLUTION
Filed Oct. 1, 1931

Inventor:
Byron C. Goss,
by Joseph W. Harris
Att'y.

Patented Mar. 21, 1933

1,901,960

UNITED STATES PATENT OFFICE

BYRON C. GOSS, OF CLEVELAND, OHIO

INSECTICIDAL SOLUTION

Application filed October 1, 1931. Serial No. 566,332.

This invention relates to liquid compositions which may be sprayed upon or otherwise applied to woolen or other goods to protect them against damage by the larvæ of clothes moths, buffalo moths, and other insects or organisms which attack such goods.

An object of the invention is to provide an efficient liquid insecticide and moth proofing composition which when sprayed upon a fabric will penetrate quickly and thoroughly into the body of fabric and other goods to be protected.

A further object is to provide a moth proofing composition consisting of a liquid in which is dissolved a gas, and which is also associated with a gas under pressure in a suitable container, said container being adapted to discharge the gas saturated liquid upon the opening of a suitable valve, and spray said gas saturated liquid upon the fabric to be protected, the liquid being absorbed rapidly by the fabric and the expansion of the dissolved gas tending to disperse or distribute the liquid over a wider area of fabric.

Such a composition must thus possess two properties, namely, first, the property of quickly and thoroughly penetrating into the materials to be protected, and, second, the property of making such materials poisonous or repellant to the damaging organisms. According to the invention, these properties may be imparted to an inert volatile liquid, such as water, by the addition to it of an ingredient which confers both the desirable properties, or of two or more ingredients which share the task of conferring the two properties desired, and the solution therein of a suitable gas.

Figure 1:
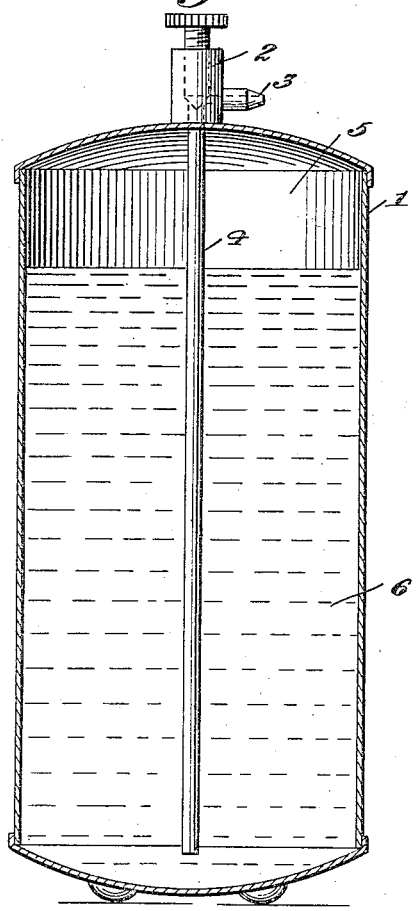
Figure 2:
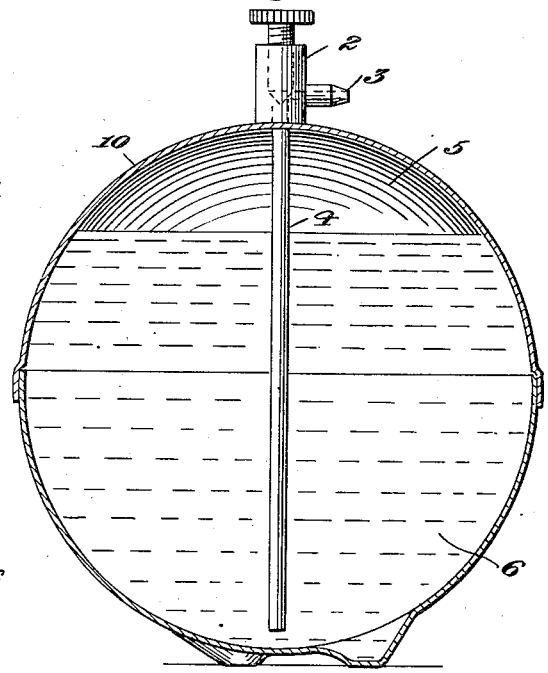

In the accompanying drawing,

Figs. 1 and 2 are sectional views of conventional types of holders, provided with needle valves, which are adapted to deliver the fluid as a spray.

In the drawing, 1 and 10, are suitable receptacles provided with needle valves 2, and spray nozzles 3. A tube 4 connected with the valve reaches almost to the bottom of the receptacle. The receptacle is suitably filled with the liquid 6 to about the level indicated, and then carbon dioxide, either as a solid, liquid, or a gas, or other suitable gas, is charged into the receptacle, in an amount sufficient to reach a pressure of from 75 to 100 pounds under normal atmospheric conditions; the gas dissolves in the liquid 6 to saturation, and the excess of gas occupies the space 5. When it is desired to use the device, the needle valve 2 is slightly opened and the gas charged liquid issues from the nozzle 3 as a spray, and may be sprayed upon the garment to be protected.

In its preferred form the composition of this invention comprises a volatile solvent, such as water, containing a non-volatile ingredient which is poisonous or repellant to the damaging organisms, another ingredient which has the property of promoting the penetration of the goods by the solution or the absorption of the solution by the goods, and a third ingredient, a gas, which is dissolved in the solution and tends to disperse the same more thoroughly within the fibers of the fabric.

Since the protective liquid is to be used in treating garments and household articles it is evident that it must be substantially harmless to man. This requirement prohibits the use of numerous insecticidal substances used in agriculture and horticulture against the larvæ, mites, beetles and other organisms that infest living plants and animals.

Substances which are suitable as the insecticidal ingredient of the present invention are certain fluorides and silicofluorides which are not only poisonous to the damaging organisms and harmless to man, but are also non-volatile and hence produce a lasting effect upon the article treated. Specific examples of such insecticidal ingredients are sodium fluoride and sodium silicofluoride. Sodium taurocholate is likewise non-volatile and has insecticidal properties, which may be enhanced by the addition of toxic chemical atoms or groups of atoms to its molecule. Sodium taurocholate not only possesses insecticidal properties but also, as hereinafter described, greatly enhances the rapid penetration of the liquid in which it is dissolved, and will thus serve a dual purpose in the solution.

In the preferred form of the invention, however, a second ingredient is employed, in addition to the insecticidal ingredient, to promote the rapid and thorough penetration of the solution into the goods to which it is applied. Aqueous or other volatile solutions containing only sodium fluoride, sodium aluminium silicofluoride or other insecticides do not penetrate rapidly into the body of the goods, and hence if the solvent evaporates rapidly, the insecticidal ingredient is deposited mainly on the surface where it is readily brushed off by friction. I have found, however, that certain substances, which markedly lower the surface tension (measured statically) of the solvent enable the insecticidal solution to penetrate fabrics and other goods with remarkable facility. These substances, in concentrations of 0.5% or less, lower the surface tension of water by over 50%. This class of substances includes the saponins, soaps, the bile salts and certain sulphonic acids. Soap, however, would be precipitated in solutions having an acid reaction, such as those containing fluorides or silicofluorides.

The prepared solution is placed in a suitable spraying vessel, and a gas soluble in the solution is introduced therein; the gas may be in the gaseous form, and introduced under relatively high pressure, for example from 75 to 100 pounds per square inch, or it may be introduced as a solid such as solid carbon dioxide, in sufficient quantity that upon its assuming the gaseous state it will dissolve in the solution, and also be in sufficient excess to produce the above noted high pressure. Gases such as air, nitrogen, carbon dioxide, (either gaseous or solid), or other neutral gases may be used. Also such liquids as liquefied ethyl chloride, methyl chloride, or other normally gaseous substances which may be readily liquefied by low temperature or high pressure or both may be introduced into the spraying vessel to produce the desired pressure upon assuming the gaseous state. The pressure of the dissolved gas in the solution aids in the more thorough penetration of said solution within the fabric to be protected, in that all of the dissolved gas does not immediately evaporate from the solution, but upon its penetration into the fabric, the dissolved gas continues to expand and disperses the insecticide solution more thoroughly within the fabric thereby aiding in its distribution and more thoroughly protecting the fabric.

A specific example of an effective liquid insecticide which fulfills the requirements outlined above is an aqueous solution containing 0.5% of sodium fluoride and 0.2% of a mixture of the bile salts sodium taurocholate and sodium glycocholate. This is a stable, colorless, odorless and nonstaining liquid, which is placed in a suitable spraying container to about the level indicated, and the container then charged with gas, such as carbon dioxide, or air, until the pressure reaches from about 75 to 100 pounds per square inch. When sprayed upon woolen cloth, it will penetrate the fabric considerably faster. When placed on woolen cloth in drops, for example by means of a pipette, it will penetrate into the cloth about twenty times faster than does plain water, or a 0.5% solution of sodium fluoride or a 0.5% solution of sodium silicofluoride, and after entering the fabric the dissolved gas will continue to expand and disperse the solution much more thoroughly than could be accomplished by merely dropping the solution on the fabric from a commercial type of pipette or dropping bottle.

When an aqueous mothproofing solution is applied to cloth by a process of spraying, the droplets that fall on the surface of the cloth have, by reason of their minute size, a very large surface in relation to their mass, and therefore have a very high speed of evaporation so long as they continue to rest unabsorbed on the surface. The longer they remain unabsorbed by the cloth while continuing rapidly to evaporate, the larger will be the proportion of the deposit of insecticide that is merely superficial. From these considerations the advantage of rapid absorption of the droplets by the cloth is evident, both as to thoroughness and permanence of protection.

The invention is not limited to the particular ingredients or to the specific proportions of ingredients herein described, which may vary widely within the scope of the appended claims.

I claim:—

1. An insecticide composition for the protection of woolen goods and the like comprising a volatile solvent containing a soluble fluoride, bile salts, and carbon dioxide dissolved therein to saturation under sufficient pressure to cause penetration of the insecticide into the goods.

2. An insecticide composition for the protection of woolen goods and the like comprising an aqueous solution containing sodium fluoride, bile salts, and carbon dioxide dissolved therein to saturation under sufficient pressure to cause penetration of the insecticide into the goods.

3. An insecticide composition for the protection of woolen goods and the like comprising an aqueous solution containing sodium fluoride, sodium taurocholate, and carbon dioxide dissolved therein to saturation under sufficient pressure to cause penetration of the insecticide into the goods.

4. An insecticide composition for the protection of woolen goods and the like comprising an aqueous solution containing sodium fluoride, sodium taurocholate, sodium glycocholate and carbon dioxide dissolved therein to saturation under sufficient pressure to cause penetration of the insecticide into the goods.

5. An insecticide composition for the protection of woolen goods and the like comprising an aqueous solution containing 1% or less of a soluble fluoride, less than 0.5% of bile salts, and carbon dioxide dissolved therein to saturation under sufficient pressure to cause penetration of the insecticide into the goods.

6. An insecticide composition for the protection of woolen goods and the like comprising an aqueous solution containing about 0.5% sodium fluoride, about 0.2% of sodium taurocholate, sodium glycocholate, and carbon dioxide dissolved therein to saturation under sufficient pressure to cause penetration of the insecticide into the goods.

In testimony whereof I hereby affix my signature.

BYRON C. GOSS.